United States Patent [19]

Flemmert

[11] Patent Number: 4,559,218
[45] Date of Patent: Dec. 17, 1985

[54] PROCESS AND APPARATUS FOR PREPARING FINELY-DIVIDED SILICON DIOXIDE HAVING GOOD THIXOTROPIC PROPERTIES

[76] Inventor: Gösta Flemmert, Agaregatan 38, 269 00 Bastad, Sweden

[21] Appl. No.: 575,476

[22] Filed: Jan. 30, 1984

Related U.S. Application Data

[63] Continuation of Ser. No. 328,286, Dec. 7, 1981, abandoned.

[30] Foreign Application Priority Data

Dec. 12, 1980 [SE] Sweden ............................. 8008768

[51] Int. Cl.$^4$ .............................................. C01B 33/12
[52] U.S. Cl. ..................................... 423/336; 423/337
[58] Field of Search ................................ 423/336, 337

[56] References Cited

U.S. PATENT DOCUMENTS

3,233,969 2/1966 Heller et al. ..................... 423/336
4,292,290 9/1981 Tunison ........................... 423/336

Primary Examiner—Jack Cooper

[57] ABSTRACT

Process and apparatus are provided for preparing finely-divided silicon dioxide having high thickening capacity and good thixotropic properties by reaction of silicon fluoride in the vapor phase with water vapor, combustible gas and free oxygen-containing gas in a flame reaction zone to form silicon dioxide and hydrogen fluoride while cooling the gaseous reaction mixture in that portion of the reaction zone adjacent the base of the flame by contact with a cooling surface maintained at a temperature below 500° C. but above the dew point of the reaction waste gases generated in the flame reaction.

7 Claims, 3 Drawing Figures

PROCESS AND APPARATUS FOR PREPARING FINELY-DIVIDED SILICON DIOXIDE HAVING GOOD THIXOTROPIC PROPERTIES

This is a continuation of application Ser. No. 328,286 filed Dec. 7, 1981, now abandoned.

The combustion process employed to prepare silica of pigment grade involves burning volatile silicon compounds in air or oxygen in the flame of a combustible gas such as coal gas or water gas, oxygen being used to oxidize the silicon compound. This process is described in British Pat. Nos. 258,313, dated Sept. 15, 1926 and 438,782 dated Nov. 22, 1935. Silica is formed according to the following reaction, in which silicon tetrafluoride and methane, a component of coal gas, are indicated as exemplary:

$$SiF_4 + CH_4 + 2O_2 \rightarrow SiO_2 + CO_2 + 4HF$$

This reaction does not present the difficulty in a vapor phase hydrolysis of achieving a sufficiently high reaction temperature, inasmuch as heat is supplied to the reaction mixture by the combustion, which is exothermic.

However, in this combustion reaction, it is difficult to control the particle size of the silica. In fact, if the burning is carried out under normal circumstances without more than an ordinary control of the flame intensity, the silica will be relatively dense and will have a mean particle size appreciably in excess of 100 nm, up to 400 nm and more. The smallest mean particle size claimed in the British Pat. No. 258,313 is 150 nm. This of course is too large for a satisfactory reinforcing agent for rubber. At the same time the yield is as low as 10 to 40% of theoretical. This means that the product obtained is unsatisfactory for the most important applications, such as use as a rubber filler and as a thickening agent in greases, paints and lacquers, and at the same time the price will be relatively high, because of the low yield.

In Broughton U.S. Pat. No. 2,535,036, dated Dec. 25, 1950, there is described a method for the manufacture of silica in amorphous finely-divided form of so-called pigment grade involving a vapor phase hydrolysis in accordance with the following equation:

$$SiF_4 + 2H_2O \rightleftharpoons SiO_2 + 4HF$$

The vapor phase hydrolysis has certain advantages over the liquid phase hydrolysis, as the Broughton patent points out. However, the hydrolysis is an endothermic reaction and requires the introduction of heat to achieve conversion of the tetrafluoride to silica. Also, it is essential to bring the reactants at least to 450° C. to effect a good reaction.

The equilibrium constants for this reaction have long been known. Bauer Z. physik. Chem. 48 483–503 (1904) reported experimental data on the equilibrium both at 104° and at 270° C. Equilibrium constants for the reaction were determined experimentally at several temperatures in the range from 200° to 800° C. by Lenfesty et al Ind. Eng. Chem. 44 1448–1450 (1952). It is apparent from Lenfesty et al's data that the reaction proceeds to the right in a significant way only at temperatures of 600° C. and above. Such temperatures are difficult to achieve with uniformity throughout the reaction mass.

In this patent, no suggestion appears that it is possible to control the particle size of the silica. As a matter of fact, it is difficult in this reaction, too, to control the particle size of the silica within reasonably narrow limits. It is desirable when the silica is to be used as a reinforcing agent in rubber compounding that the silica have a mean particles size of 50 nm or less. A large proportion of the silica particles obtained in this vapor phase hydrolysis usually are as large as 400 nm and the mean particle size usually is of the order of 100 to 200 nm.

In accordance with Flemmert U.S. Pat. No. 2,819,151, patented Jan. 7, 1958, a silicon fluoride, a combustible gas and oxygen are reacted together in a flame, thereby forming silica and hydrogen fluoride. The flame intensity is increased beyond normal intensity so as to increase the temperature and decrease the conversion time. The flame intensity can be increased by various methods, which are described, and the intensity is controlled within specified limits so as to yield silica in the form of spherical amorphous particles having an arithmetic mean diameter within the range from about 5 to about 50 nm.

The reaction probably proceeds in certain zones of the flame. The intensity of the flame in these reaction zones is of primary importance in determining the particle size of the silica, and for this reason can be regarded as equivalent to the intensity of the reaction. However, the flame intensity in the reaction zones is difficult to measure except in terms of the heat liberated by the reaction, which of course is directly proportional to the heat liberated by the flame, and therefore for the purposes of the invention, the intensity of the reaction is measured by the intensity of the flame itself.

The intensity of the flame can be measured in terms of the amount of heat liberated per unit volume and per unit time, i.e., B.t.u./Cu. ft. min.

These quantities for the purposes of the invention are measured in British thermal units, abbreviated B.t.u., cubic feet and minutes. For convenience of representation, reciprocal B.t.u. units are used, i.e., 1/B.t.u.

or B.t.u.$^{-1}$, and the terms "reciprocal B.t.u." and "B.t.u.$^{-1}$" will be understood to refer to the volume of the flame in cu. ft. for each B.t.u. evolved per minute in the flame.

Accordingly, in the Flemmert process the flame intensity is maintained within the range from about 0.1 to about $1.3 \times 10^{-5}$ B.t.u.$^{-1}$. This range lies essentially below the intensity of a normal flame in which silicon fluorides are subjected to the reaction in accordance with the invention. These intensity limits are critical, inasmuch as at flame intensities both above and below these limits the silica particle size again increases.

The process results in an extremely finely-divided silicon dioxide having an average particle size of from 5 to 50 nm, corresponding to a specific surface area of from 50 to 400 m²/g.

Of the two most readily available silicon tetrahalide source materials, silicon tetrafluoride or silicon tetrachloride, silicon tetrafluoride has many advantages which suit it better for commercial scale production of silica. Silicon tetrafluoride can be easily prepared from hydrofluosilicic acid, which is a cheap waste product obtained in large amounts in the preparation of phosphoric acid and superphosphate from phosphate rock. On the other hand, silicon tetrachloride is a relatively expensive material, usually prepared by reaction of silicon and chlorine, each relatively expensive materials requiring large amounts of electrical energy in their preparation, and an equally expensive reaction to form silicon tetrachloride.

U.S. Pat. No. 2,819,151 points out that there is a relationship between the specific surface area of the silicon dioxide and the silicon fluoride concentration in the flame, and also a relationship between flame intensity and the particle size of the silicon dioxide. However, surprisingly, there are also differences in the silica obtained according to whether the starting material is silicon tetrachloride or silicon tetrafluoride.

The silica prepared from silicon tetrachloride is superior to that prepared from silicon tetrafluoride as a thickening agent for liquid products such as liquid polyester compositions, dyes, and lacquers. This is apparent from the fact that more of the silica prepared from silicon tetrafluoride is required than of the silica prepared from silicon tetrachloride in order to obtain a desired thixotropic effect and a desired viscosity in the fluid.

A similar difference is noted when the silica is employed as a reinforcing filler in synthetic rubber and in silicone rubber compositions. A higher proportion of silicon dioxide prepared from silicon tetrafluoride is required to obtain the desired hardness and modulus than when using silica prepared from silicon tetrachloride.

The fact that more silica is required poses a number of problems, not the least of which is the greater cost. A larger proportion of silica also needs a larger mixer, since silica is very voluminous when dry. Moreover, a longer mixing time is needed, with a resulting higher energy consumption. The undesired side effects that accompany the presence of silica also are increased when the amount of silica is larger. Since extremely finely-divided silica is a relatively expensive material, these drawbacks have seriously affected the marketing of silica prepared from silicon tetrafluoride.

Until the present invention was made, the reason for the difference in properties of the silica has not been understood. Now that the present invention has been developed, however, it appears that the reason is that the silica prepared from silicon tetrafluoride using the normal flame reaction procedure has a lower degree of aggregation, that is, the silica particles are agglomerated into widely-branched chain-like agglomerates to a lesser degree than the silica prepared from silicon tetrachloride. This explanation is offered because the silica obtained in the process and apparatus of the invention has been found to have a higher degree of agglomeration, and has a very good thickening capacity and good thixotropic properties, superior to the ordinary silica prepared from silicon tetrafluoride, and also to the silica prepared from silicon tetrachloride as well.

In accordance with the invention, a process is provided for preparing finely divided silicon dioxide having thickening capacity and good thixotropic properties which comprises reacting silicon fluoride in the vapor phase with water vapor, combustible gas and free oxygen-containing gas in a flame reaction zone to form silicon dioxide and hydrogen fluoride while cooling the gaseous mixture in that portion of the reaction zone adjacent the base of the flame by contact with a cooling surface maintained at a temperature below 500° C. but above the dew point of the reaction waste gases generated in the flame reaction.

In accordance with the invention, apparatus is also provided for preparing finely-divided silicon dioxide having high thickening capacity and good thixotropic properties by vapor phase hydrolysis of silicon tetrafluoride, comprising, in combination:

(1) at least one burner generating by combustion of combustible gas with free oxygen-containing gas a flame defining a flame reaction zone;

(2) cooling means providing a cooling surface in contact with gaseous reaction mixture in the flame reaction zone adjacent the base of the flame generated by the burner for cooling the base of the flame reaction zone;

(3) means for maintaining the cooling surface at a temperature above the dew point of the combustion reaction waste gases generated in the flame reaction zone, but below 500° C.;

(4) means for passing silicon tetrafluoride to the burner for combustion in the flame;

(5) means for passing combustible gas and free oxygen-containing gas to the burner for generation of a flame; and (6) means for recovering gaseous reaction mixture and entrained silicon dioxide from the flame reaction zone.

Preferred embodiments of the apparatus of the invention are shown in the drawings, in which.

The flame reaction can be carried out in one or several flames. It is however easier to cool the flame and thereby control the reaction temperature if a number of smaller flames are used, in preference to one or two large flames.

While it is critical to cool the flame reaction zone at the base of the flame, i.e., at the portion of the flame nearest to the burner nozzle, it is of little importance whether the tip of the flame be cooled or not. If the flame is large, cooling of the tip may be helpful to maintain a lower temperature, but if the flame is small, there is little or no improvement.

It is not possible to be certain of the reason why the process and the apparatus of the invention are effective in increasing the agglomeration of the silica particles. It seems likely that when the flame reaction zone at the base of the flame is cooled, a relatively small number of silicon dioxide seed particles is formed in this part of the flame reaction zone. These seed particles gradually grow, during passage through the flame reaction zone, and when they collide they tend to stick with each other, and grow together, with the continued precipitation of silicon dioxide in the course of the reaction. The result is that relatively large, chain-like agglomerates or aggregates of silicon dioxide particles emerge as the reaction product from the flame reaction zone.

In the flame reaction zone at the base of the flame is not cooled, as in the normal process, a large number of seed silicon dioxide particles are formed and all grow rapidly into larger silicon dioxide particles in the course of the reaction. Because of the large number of seed particles, and the larger surface area on which the silica can precipitate in the course of the reaction, at the same concentration of silicon tetrafluoride relatively less silicon dioxide is deposited on each particle, and consequently the formation of large aggregates or agglomerates becomes less likely. This appears to explain why the silicon dioxide obtained in the normal flame reaction process has a relatively small particle size, i.e., a high specific surface area, and a low degree of aggregation.

The vapor phase hydrolysis reaction in the flame reaction zone is carried out under the conditions described in U.S. Pat. No. 2,819,151.

The flame intensity and with it the reaction intensity can be controlled by several expedients. Many will occur to those skilled in the art, but the following are mentioned as preferable.

In the ordinary flame, the combustible gas and the gas containing the silicon fluoride are mixed in the flame zone with enough oxygen to support combustion. This technique can be used in the invention if one or more of the gases is preheated, or if the gases are mixed in the flame reaction zone with great turbulence. Otherwise, it is desirable to mix the silicon fluoride and the combustible gas together with a part or all of the oxygen-containing gas before introduction into the flame. The increase in intensity becomes quite marked when the preformed mixture contains 25% of an oxygen-containing gas.

The silicon fluoride, the combustible gas and the oxygen-containing gas can be mixed thoroughly in the flame zone, by utilizing fine jets and discharging the gases into the flame under pressure. If the jets are small and fixed to impinge on a common focus or foci the mixing will be quite thorough. A swirling motion may be imparted to the gas mixture to ensure better mixing.

It also may be convenient to mix the combustible gas and the silicon tetrafluoride and possibly some part of the oxygen-containing gas together and then discharge the mixture from a multiplicity of small jets into the flame zone. In this way small intense flames can be obtained at each jet.

The proportions of silicon fluoride to combustible gas influences the flame intensity in that a higher amount of silicon fluoride gives a lower flame intensity. Further, the amount of silicon tetrafluoride has a considerable influence on the yield of silicon dioxide in that the yield decreases with increasing amounts of silicon fluoride. Therefore it most often is suitable to use a considerable excess of the combustible gas, as is seen from the Examples given below. With these factors in mind, however, the amount of silicon fluoride can be varied within wide limits. In the case of hydrogen as the combustible gas a good yield is obtained using less than approximately 0.5 g of silicon tetrafluoride to each liter of hydrogen and when commercial propane gas is used the optimum is less than about 1.5 g of silicon tetrafluoride per liter of gas; there is no lower limit except as dictated by economic reasons, because of a lowering in efficiency due to too small an amount of the fluoride to make the process practical for the amounts of gas burned.

The amount of oxygen or oxygen-containing gas also has a considerable influence on the flame intensity, in that an excess of oxygen (as compared with the theoretical amount) normally increases the intensity to a maximum, but beyond this point a further excess of oxygen-containing gas lowers the flame intensity, and renders the flame more unstable. The more intense the mixing of the gases introduced into the flame, the lower the excess of oxygen necessary in order to obtain the optimum flame intensity. In practice, an excess of 10 to 75% oxygen has proved to be preferable.

Introduction in the flame of diluting gases, for instance, nitrogen, hydrogen fluoride or water vapor, considerably decreases the flame intensity. Therefore, when inert gases are present in appreciable amounts in the flame it is necessary to provide a very intense mixing and possibly also to use preheated gases in order to obtain the flame intensity desired. If on the other hand the gases introduced in the flame are not diluted or are diluted only in part with inert gases, the flame intensity may exceed $0.1 \times 10^{-5}$ B.t.u.$^{-1}$, giving a mean particle size coarser than 50 nm.

As stated, it is possible to preheat one or more of the gases or the gas mixture before introduction into the flame zone. This alternative may be combined with any of the above procedures. The higher the temperature, the greater the effect of the preheating. However, when preheating gas mixtures containing both the silicon tetrafluoride and water vapor the temperature should be below that at which the gases will react to form silica; usually 400° C. is the threshold temperature for such a reaction.

The heat and intensity of the flame can be further increased by enclosing all or a part of the flame zone outside the cooling surfaces at the base of the flame within a heat reflecting surface. Ceramic-surfaced bricks can be used, for example.

Any combination of two or more of the above procedures will further increase the flame intensity.

It is desirable to have a flame of uniform intensity throughout. To this end, a multiplicity of small flames can be used rather than one large flame, since the intensity tends to be more uniform in smaller flames. Introducing the gas mixture into the flame, whether large or small, with high turbulence also tends to increase uniformity. The more uniform the flame, the more uniform the particle size distribution of the silica, that is, the smaller the difference between the largest and the smallest particles and the mean particle size. Naturally, the uniformity will depend to an appreciable extent upon the type of burner employed.

Figure 1:
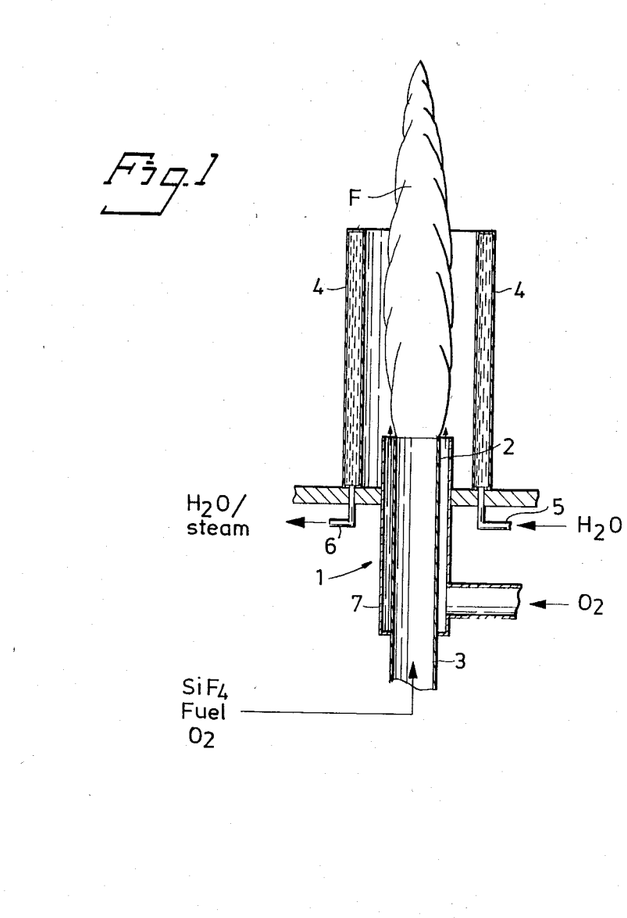
FIG. 1 shows in cross-section a single burner nozzle of relatively large size, surrounded by a cylindrical cooling surface.

It should be pointed out that in the region from 5 to 50 m $\mu$ of the graph of FIG. 1 of U.S. Pat. No. 2,819,151 representing the region of flame intensity within the invention, relatively large changes in the volume of oxygen-containing gas, silicon tetrafluoride and combustible gas proportions make only small changes in the particle size. However, in the region above $1.3 \times 10^{-5}$ B.t.u.$^{-1}$, i.e., the flames having a lower intensity than is required, relatively small differences in such proportions will produce large variations in particle size, and the particle size distribution will also be greater.

As the silicon fluoride, silicon tetrafluoride is preferably employed in the process of the invention. Compounds which generate the tetrafluoride in the vapor phase, such as hydrofluosilicic acid $H_2SiF_6$ and $Si_2F_6$, also can be used, and the silicon hydrofluorides, $HSiF_3$, $H_2SiF_2$ and $H_3SiF$, represent additional possibilities, although they are less readily available and much more expensive than the tetrafluoride.

The silicon tetrafluoride which is employed in the process of the invention can be generated by any of the various well-known procedures.

One method is well known and reported in the literature. Fluorite or fluorspar can be used as a source. This reacts with sulfuric acid solution and sand according to the following reaction:

$$2CaF_2 + SiO_2 + 2H_2SO_4 \rightarrow SiF_4 + 2CaSO_4 + 2H_2O$$

When 70% sulfuric acid solution is employed and the materials are mixed and heated, silicon tetrafluoride gas is liberated and this can be mixed with a combustible gas and an oxygen-containing gas as stated above.

In British Pat. No. 438,782 another method is described involving the treatment of pulverized sand or silicates such as clay, waste glass, etc., with aqueous hydrofluoric acid, whereupon the silicon fluoride is evolved as a gas. This procedure makes possible the utilization of the reaction of the invention in a cyclic process, recycling the hydrogen fluoride liberated as a byproduct of the desired silicon-forming reaction to react again with sand to form silicon tetrafluoride. In effect, the method in this case reduces sand to the amorphous overall particle size desired for use in rubber compounding. See also Ephraim's *Inorganic Chemistry*, 4th Edition, pp. 774–781 (1943), Nordeman Publishing Co.

In another procedure, useful in a cyclic process, an aqueous solution of hydrofluoric acid is passed into a chamber filled with silica, generating a solution of fluosilicic acid $((HF)_x.SiF_4)$ where x is less than 1, 1, 2 or more. This is vaporized and reacted as described. Hydrogen fluoride and silicon tetrafluoride in the effluent from the combustion reaction can be absorbed in water or in solid sodium fluoride to form a complex sodium hydrofluoride, or in aqueous fluosilicic acid solution, and others as disclosed in the literature, and concentrated if necessary, and then again utilized for manufacturing new amounts of fluosilicic acid.

In a cyclic process utilizing solid sodium fluoride, the following reactions take place:

Absorption at below about 300° C., say 105° C.
$$NaF + HF \rightarrow NaHF_2 \text{ (or } NaH_2F)$$
$$2NaF + (\text{excess } SiF_4) \rightarrow Na_2SiF_6$$

Desorption at about 325° C. or higher, say 350° C.
$$NaHF_2 \text{ (or } NaH_2F) \rightarrow NaF + HF$$

The hydrogen fluoride thus obtained then is recycled and again reacted with silica, usually in an aqueous solution, to form silicon tetrafluoride.

As the combustible gas in the process of the invention there can be used any gas containing hydrogen, including hydrogen itself, or if hydrogen is supplied to the flame in some other form, for instance as fluosilicic acid and water vapor, other combustible gases which do not contain hydrogen such as carbon monoxide may be used. Volatile hydrocarbons and mixtures thereof are a convenient source of supply because they are plentiful and inexpensive, and among these there can be mentioned the aliphatic, alicyclic and aromatic hydrocarbons. Examples of combustible gases are producer gas, natural gas (mostly methane and ethane), commercial propane gas (a mixture of methane, ethane, propanes and butanes), commercial butane gas, benzene, water gas (a mixture of hydrogen and carbon monoxide), kerosene, methane, ethane, naphthenes, and gasoline, all in the vapor phase. If steam be added to the flame, hydrogen-free combustible gases such as carbon monoxide can also be used. Particularly good silica products are obtained using pure hydrogen gas or gas mixtures containing more than 60% by volume of hydrogen gas.

The nature of the combustible gas is not critical, although, as will be apparent, the amount of heat liberated in combustion of the gas is important. The range for flame intensity set forth were computed using hydrogen, carbon monoxide and a mixture of hydrocarbons as exemplary. If the combustible gas differs greatly from these materials in the amount of heat liberated in burning with oxygen, modifications may have to be made in the operating procedure suggested. It may, for example, be desirable to mix this material with a material liberating larger amounts of heat, so that the average will closely approximate that liberated in the burning of propane or hydrogen.

As an oxygen-containing gas in the above procedures, air can be used as well as other mixtures of oxygen with inert gases, such as nitrogen and carbon dioxide, and even oxygen itself. Intensity of the flame is strongly increased if in place of air pure oxygen or an oxygen-enriched air is employed.

The apparatus which can be used in carrying out the generation of silicon tetrafluoride from sand is conventional in type. The silicon tetrafluoride generator can be an ordinary reactor equipped with a stirrer and external cooling. Into this is introduced a continuous stream of hydrofluoric acid and sand, the latter suitably containing at least 98% silicon dioxide. The solution in the reactor may contain an excess of dissolved silicon dioxide. The solution is conducted to a vaporizer where it is heated to eject the silicon tetrafluoride, together with some water vapor and some unreacted hydrogen fluoride. The mixture of silicon tetrafluoride and water vapor is conveyed through a pipe to the combustion chamber.

The apparatus which can be used in generating silicon tetrafluoride from fluorspar, sand and sulfuric acid is conventional in type. The silicon tetrafluoride generator can be an ordinary reactor equipped with a stirrer and external heating, and silicon tetrafluoride is liberated directly in the vapor phase.

The gases may be preheated by external heating and eventually mixed in order to obtain a sufficiently intense flame.

The combustion chamber can be a closed reaction chamber of metal lined with fireproof brick having ceramic or metallic reflecting surfaces to increase the heat in the flame zone. Into this chamber also is conducted an oxygen-containing gas, such as air, and the combustible gas, such as natural gas or hydrogen.

In order to obtain a sufficiently intense flame many different types of burners may be used, the essential factor being that the reacting gases very quickly are brought in intimate contact with each other, thus making possible a very intense reaction. If large burners are used, the burner should generate a flame whose maximum flame intensity is 200 kW. If small burners are used, the burner should generate a flame whose flame intensity does not exceed 10 kW.

Good results have been obtained with burners comprising a cylindrical mixing chamber in which silicon tetrafluoride, the combustible gas and air are mixed and the mixture passed through a screen or perforated plate with many fine apertures. The mixture is ignited outside the screen or plate, which prevents the flame from backfiring into the mixing chamber.

Another type of satisfactory burner is equipped with three concentric tubes, the oxygen-containing gas being supplied through the innermost and outermost tubes and the mixture of silicon tetrafluoride with a combustible gas and desirably a portion of the oxygen-containing gas is admitted through the intermediate tube. One large or a battery of small burner jets of this type can be used.

Figure 2:
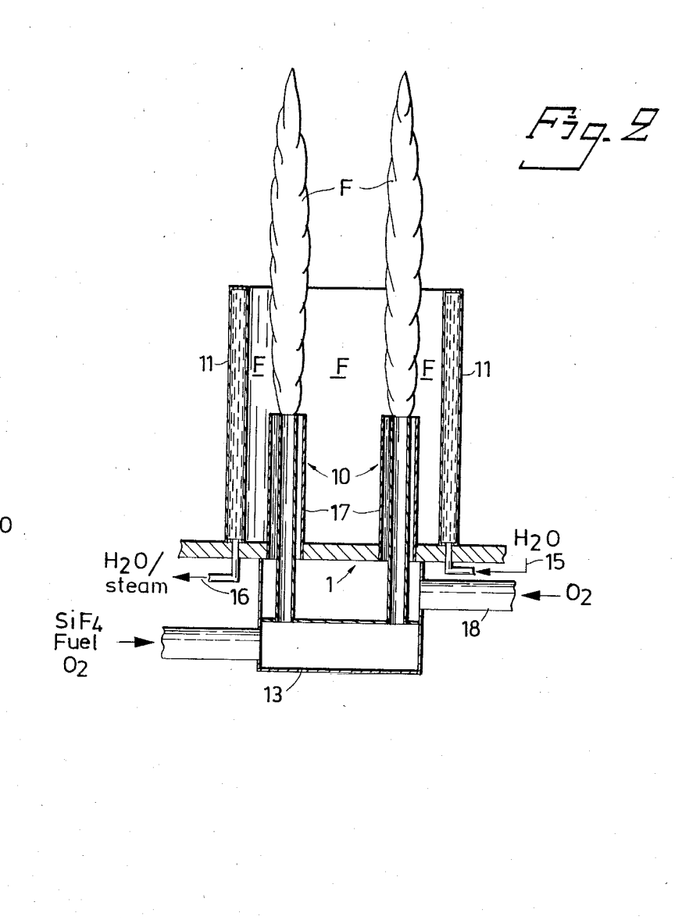
FIG. 2 shows an array of smaller nozzles with the entire array surrounded by a cylindrical cooling surface.

As is apparent from FIGS. 1 and 2, the cooling surfaces can be so arranged that every burner nozzle is entirely surrounded by a cylindrical cooling means, or a group of burner nozzles can be surrounded by a common enclosing cooling means. The cooling means can take the form of a boiler or a heat exchanger through which a cooling fluid, liquid or gas, is circulated, so as to keep cool the surface that faces the flame reaction zone.

The cooling surface can wholly or partially surround or enclose the flame reaction zone. The cooling means can be tubular, as in FIG. 1, with the cooling fluid circulated between concentric tubes on the exterior of the cooling surface. The cooling means can also take the form of a manifold through which the fluid is circulated, with a number of open tubes extending through the manifold in which the burners are inserted, in a manner such that the manifold encloses the base portion at least of the flame reaction zone about each burner. Other variations will be apparent.

The temperature of the cooling surface is important. The temperature should be above the dew point of the combustion waste gases formed in the flame reaction zone. Otherwise, condensate can form on the cooling surface, causing corrosion, and an impairment of the cooling properties, with a deleterious effect upon the silicon dioxide product.

On the other hand, the higher the cooling surface temperature, the less the effect on the particle size and the degree of aggregation of the silica. As the cooling effect decreases, the reaction temperature increases, and the particle size of the silica decreases. Accordingly, the cooling surface should be kept at a temperature below 500° C.

The cooling of the flame occurs mainly by means of heat radiation from the flame to the cooling surface. This means that the distance between the cooling surface and the flame is not critical. Normally the distance is however kept less than 200 mm.

The temperature within the flame is of course considerably higher than 500° C., although it is virtually impossible to measure with any accuracy. It is however apparent that the temperature in the flame reaction zone at the cooling surface is considerably lower, because of the effect on the particle size of the silica. It is therefore sufficient, to control the reaction and improve the agglomeration of the silica, to control the temperature of the cooling surface, rather than the temperature of the flame, and the temperature in the flame reaction zone can be gauged sufficiently accurately by this means to control the reaction as required to increase the agglomeration of the silica.

Cooling at such elevated temperatures requires unusual cooling fluids, since not many liquids are liquid at such high temperatures. The liquid can however be kept in the liquid phase under pressure. Usually, it is easier to utilize a cooling gas, or a liquid which is free to boil and thus establish a cooling temperature by virtue of its boiling point at the pressure established in the cooling means. Thus, for example, boiling water, optionally under pressure, is a very advantageous cooling fluid. The steam can be recovered and the heat thus withdrawn and utilized elsewhere in the reaction system, or in another part of the plant.

Another suitable cooling fluid is the cooled waste gases from the combustion, the waste gases having been freed from their content of silica. The hot waste gases from the heat exchanger can be used for flushing the walls of the burner chamber, and thereby prevent the deposition of silicon dioxide within the burner reaction zone.

The hot exhaust gases from the burner with their content of silicon dioxide are conveyed to a dust separator. In this area the temperature is suitably kept at about 200° C. to avoid condensation of hydrofluoric acid, because, as is well known, hydrofluoric acid is readily formed at temperatures below the dew point.

To recover the hydrogen fluoride the gases from the separator can be conducted to a conventional condenser and concentrated. The concentrated hydrofluoric acid thus obtained is returned for reuse in the treatment of fresh amounts of silica. The exhaust gases are discharged to the atmosphere. Or the hydrogen fluoride can be conducted to an absorption tower containing sodium fluoride, where it is absorbed at about 105° C., liberated later as desired by heating to 350° C. or above, and returned to form more silicon tetrafluoride.

If the gaseous reaction product mixture is cooled before separation of silicon dioxide and hydrogen fluoride, the reaction is reversed, and the finely divided silicon dioxide which is formed at high temperatures now reacts with the hydrogen fluoride, regenerating silicon tetrafluoride according to the reaction $$SiO_2 + 4HF \rightleftharpoons SiF_4 + 2H_2O$$

This reverse reaction becomes significant at temperatures below 600° C., and increases in rate as the temperarture drops. Experiments have shown that the finely-divided silicon dioxide, which has a very large surface area, rapidly reacts with the hydrogen fluoride at temperatures below 450° C. Thus, if the temperature of the reaction mixture is lowered below 600° C. by indirect cooling, the silicon dioxide will be converted to a great extent to silicon tetrafluoride, thus resulting in a low yield and an uneconomical process.

The reaction proceeds in the direction of silicon dioxide formation at 600° C. and over, and good yields of silicon dioxide can be obtained, but other difficulties arise. The gas containing hydrogen fluoride is highly corrosive at such high temperatures, and thus it is difficult to find a suitable construction material for the separators. In addition, the silicon dioxide particles are rapidly disproportionated at high temperatures, so that the larger particles grow larger whereas the smaller particles grow smaller and eventually disappear, so that a product of larger particle size is obtained which is less active and thus less valuable.

In accordance with Flemmert U.S. Pat. No. 3,203,759, patented Aug. 31, 1965, silicon dioxide as obtained by the vapor phase reaction of silicon fluorine compounds and water can be maintained in active forms as particles of from 2 to 200 mμ in size by diluting the mixture of gas byproducts and suspended silicon dioxide from the reaction zone with an inert gas having a lower temperature than that of the reaction mixture and in an amount sufficient to reduce the reaction mixture temperature to below 600° C., and preferably to within the range from 350° to 575° C., but above the dew point of the diluted mixture. The silicon dioxide is then separated from the cooled diluted suspension. A good yield of high quality silicon dioxide is obtained, a surprising result in veiw of the reversibility of the reaction at such temperatures.

For cooling the reaction mixture, any inert gas can be used, i.e., any gas which will not react with any of the components desired to be recovered from the reaction mixture. Suitable gases are exemplified by air, water vapor, nitrogen, carbon dioxide, neon, helium, argon and like rare gases, and exhaust gases from combustion processes. The preferred diluent is the exhaust or by-product gases from the reaction after finely divided silicon dioxide has been separated therefrom, and they have been cooled to a suitable temperature, for the reason that no lowering of the concentration of the gaseous components occurs, thereby facilitating recovery of hydrogen fluoride and unreacted silicon tetrafluoride therefrom, if such be desired.

The quantity of cooling gas admixed and its temperature are so adjusted as to obtain the temperature to which the reaction mixture is to be brought. These variables can thus be controlled within wide limits, according to the desired degree of cooling. It has been found in practice that from one to eight times the volume of the reaction mixture gases is the optimum range of operation. The quantity of gas admixed is suitably such that the resulting temperature is below 600° C. but above the dew point of the diluted mixture. Within this temperature range it is comparatively easy to overcome the practical problems involved in the silicon dioxide separation step, such as corrosion and mechanical strength problems, for example.

The mode of admixture of cooling gas is not critical, and can be carried out in a variety of ways. Thus, for instance, in using the process and apparatus described in U.S. Pat. No. 2,819,151, for instance, at column 5, line 67 through column 6, line 37, the gas may be introduced behind the flame in a manner to form a curtain of gas surrounding the same. This curtain may be directed either parallel to the direction of flow of the flame, or tangentially thereto, resulting in a vortex action.

It has been found particularly advantageous to introduce the cooling gas at the end of the reaction zone. This results in the advantage that the reaction zone itself will not be cooled or disturbed, whereas the reaction product will be rapidly cooled down after the reaction. In order to obtain most effective mixing, the cooling gas may be introduced through suitably shaped nozzles.

After admixing the cooling gas, silicon dioxide separation can be carried out by means of a mechanical precipitator. The term "mechanical precipitator" here denotes all types of precipitators except filters and electrostatic precipitators. As examples of mechanical precipitators, there can be mentioned cyclones and centrifugal precipitators, impingement precipitators and gravimetric precipitation chambers. It has not been possible to separate the finely-divided silicon dioxide obtained after cooling and dilution in accordance with this invention by means of filters or electrostatic precipitators. Teflon polytetrafluoroethylene or ceramic filters give a recovery of silicon dioxide of as low as 2 to 20%, and the process is therefore uneconomical if these are used. Electrostatic precipitators also give poor recovery of silicon dioxide and the process again is uneconomical.

The fluorine content of the waste gases can be recovered in accordance with the method described in Flemmert U.S. Pat. No. 3,969,485, patented July 30, 1976.

The first stage is the absorption of the silicon- and fluorine-containing compounds from the exhaust gases in water. Hydrogen fluoride is quite water-soluble, and dissolves quickly. Silicon tetrafluoride is hydrolyzed to form hydrofluosilicic acid. In addition, if the silicon tetrafluoride concentration is high, finely divided but undissolved silicon dioxide will also be formed in the aqueous hydrofluosilicic acid solution. Consequently, high silica fluosilicic acid may also be formed in the solution, having the approximate composition $H_2SiF_6 \cdot SiF_4$. The waste gases may also contain a proportion of silicon dioxide, which will remain suspended in the aqueous fluosilicic acid solution.

The absorption can be carried out at room temperature. The waste gases can be brought in contact with a spray of water, preferably flowing countercurrently to the gas flow, to improve the mixing. This type of operation is particularly adapted for a continuous process. A high enough proportion of water to waste gases is used to remove substantially all of the silicon- and fluorine-containing components thereof.

This absorption process is known, and consequently further details need not be given.

The solution of hydrofluosilicic acid and silicon dioxide or hydrogen fluoride is then reacted with sulfuric acid to form silicon tetrafluoride and hydrogen fluoride. The same products are formed from hydrofluosilic acid mixed with silicon tetrafluoride, high silica fluosilicic acid of the composition $H_2SiF_6 SiF_4$, and when silicon dioxide is present as well, silicon tetrafluoride is formed also, but in this case, the byproduct is water instead of hydrogen fluoride.

The sulfuric acid does not, in fact, take part in this reaction but functions only as an absorption agent for any hydrogen fluoride or water that may be formed, besides producing an acidic reaction medium which favors the reaction.

The proportion of hydrogen fluoride to silicon tetrafluoride that is formed in this reaction depends upon the relative proportions of hydrofluosilicic acid and silicon tetrafluoride in the reaction mixture. Whereas hydrofluosilic acid forms two mols of hydrogen fluoride for each mol of silicon tetrafluoride, in the presence of equimolar quantities of hydrofluosilicic acid and silicon tetrafluoride equimolar quantities of silicon tetrafluoride and hydrogen fluoride are formed, while in the presence of $SiO_2$ the formation of hydrogen fluoride is suppressed. Thus, by varying the proportions of these components in the reaction mixture, any desired ratio of silicon tetrafluoride to hydrogen fluoride can be produced in this reaction stage. Thus, the proportions of silicon tetrafluoride to hydrogen fluoride in the reaction product can be closely controlled, as may be desirable.

The reaction between hydrofluosilicic acid and sulfuric acid is preferably carried out in a reactor which is equipped with a stirrer. The amount of concentrated sulfuric acid is so adjusted that the reaction mixture contains from about 60 to about 90%, preferably from about 65 to about 75%, sulfuric acid by weight. The reaction may be carried out at an elevated temperature within the range from about 50° to about 150° C.

Silicon tetrafluoride is a gas, as also is hydrogen fluoride, and both gases are readily liberated from the aqueous reaction solution, particularly at elevated temperatures within the stated range. The gas mixture liberated from the reaction mixture also contains water vapor. To separate silicon tetrafluoride from hydrogen fluoride and water, the gases from the reaction mixture may suitably be passed through a scrubber, in which they are brought into contact with the entering concentrated sulfuric acid. Some silicon tetrafluoride dissolves in the entering acid, and thus increases the silicon tetrafluoride concentration of the entering sulfuric acid but the acid also absorbs substantially all of the hydrogen fluoride and water vapor in the gas, and a stream of relatively pure silicon tetrafluoride can be separated from the acid in the scrubber.

Then, in the third stage, silicon tetrafluoride is recycled, and hydrolyzed in the gas phase with water to form highly active silicon dioxide and gaseous hydrogen fluoride.

The drawings will now be described.

The cooled burner composite shown in FIG. 1 includes a burner 1 of conventional type, composed of a nozzle 2 into which is fed a mixture of combustible or fuel gas, silicon tetrafluoride, and primary air through the line 3. The burner nozzle 2 is provided with an annular jacket 7, through which is fed secondary air. The burner nozzle is enclosed within a concentric cylindrical cooling jacket 4, through which boiling water is circulated, entering through line 5, and being withdrawn through line 6, together with steam formed in the course of the heat exchange.

The gaseous reaction mixture generated in the flame reaction zone F above the burner is composed of waste gases from the combustion and from the hydrolysis of the silicon tetrafluoride, as well as extremely finely-divided silicon dioxide suspended and entrained in the upward flow of waste gases through the flame reaction zone F. These are accordingly withdrawn overhead, and the silicon dioxide recovered, using, for example, any of the procedures described above.

The apparatus shown in FIG. 2 is composed of a plurality of burners 10, of which two are shown, similar to that shown in FIG. 1, but enclosed within a common concentrically arranged cylindrical cooling jacket 11. The jacket is cooled by feeding water through the line 15, withdrawing hot water and steam through the line 16. Through the cylindrical jackets 17 surrounding each burner there is fed secondary air from line 18, while combustion gas, silicon tetrafluoride and primary air are fed directly into the burner through the line 13.

The gaseous reaction mixture in the flame reaction zone F from the burners is composed of the waste gases from the combustion and from the hydrolysis of the silicon tetrafluoride, as well as the finely-divided silica suspended and entrained in the gaseous reaction mixture. The gases and accompanying silica are preferably cooled at once and the silica then recovered, using for example, the procedure described above.

Figure 3:
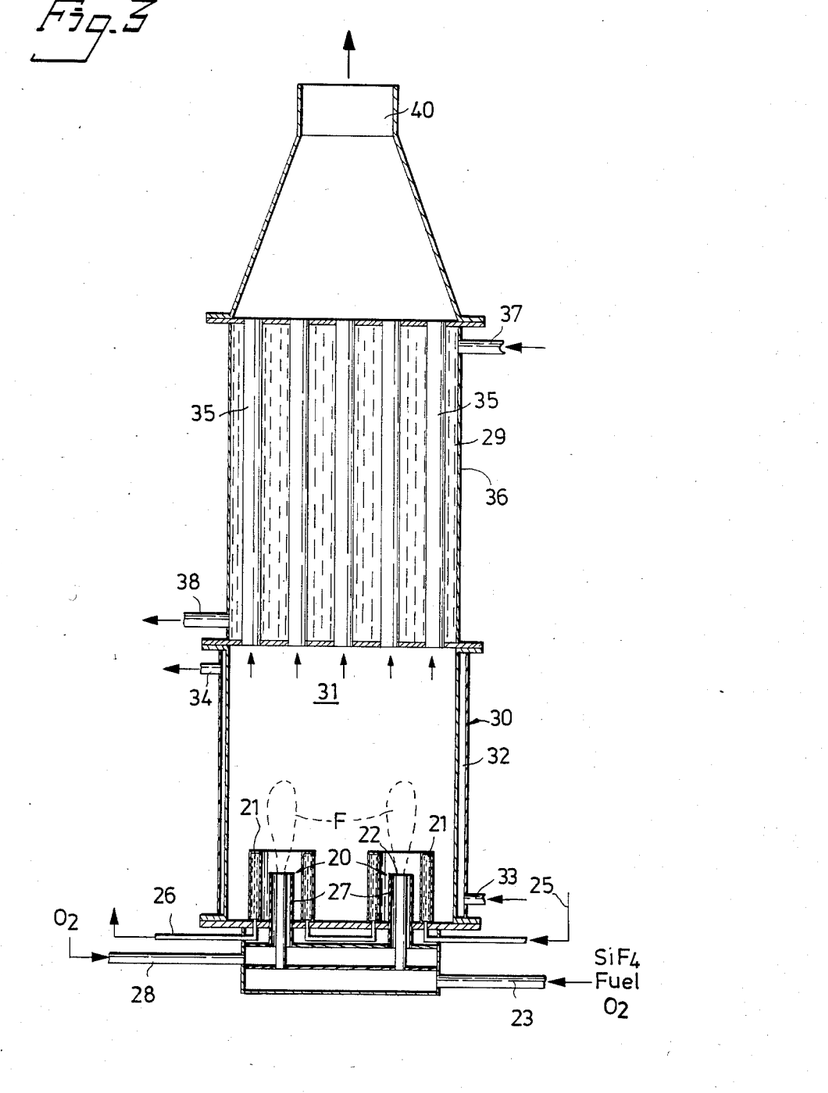
FIG. 3 shows an array of burner nozzles, each burner nozzle being surrounded by its own cylindrical cooling element, and a tube cooler for cooling the silicon dioxide particles as they emerge from the flame to reduce loss of the reaction product by reversal of the reaction.

The apparatus shown in FIG. 3 has a number of burners 20, each of the type shown in FIG. 1, enclosed within its own cylindrical cooling jacket 21. Boiling water is circulated through line 25 and steam and water withdrawn through the line 26. Secondary air is supplied to jackets 27 of the burners through the line 28, while silicon tetrafluoride, combustion gas and primary air is fed to the burner nozzles 22 through the line 23.

The cylindrical reactor 30 defines a reaction chamber 31 with its own cooling jacket 32, through which cold air is circulated, entering through the line 33 with the hot air being withdrawn through the line 34.

The gaseous reaction mixture from the flame reaction zone F is composed of waste combustion gases and gases from the hydrolysis of the silicon tetrafluoride as well as the extremely finely-divided silica, suspended and entrained in the gas flow. The gases and the accompanying silica then enter the tube cooler 29, composed of a plurality of tubes 35, cooled by a flow of water flowing through the manifold 36, entering at line 37 and emerging as a mixture of steam and water at line 38. In this way, the gas temperature is reduced to below 600° C. very quickly, within seconds. The gas flow is very rapid, and the cooled gaseous mixture then exits at 40.

Then, the finely-divided silicon dioxide is separated in a cyclone separator (not shown), while the hydrogen fluoride content of the waste combustion gases is recovered by absorption in water, in accordance with the procedures described above.

The following Examples in the opinion of the inventor represent preferred embodiments of the invention.

In these Examples, the degree of aggregation or agglomeration of the silicon dioxide reaction product is measured using the following empirical test, based on the capability of the silicon dioxide to thicken unpolymerized liquid polyester.

One part by weight of silicon dioxide is mixed with one hundred parts by weight of polyester liquid, and the silicon dioxide then thoroughly dispersed in the liquid using a colloid mill. The viscosity of the resulting mixture is measured using a Brookfield viscosimeter LVT at 12 revolutions/minute at 25° C.

The viscosity of a mixture of polyester with normal or standard silicon dioxide obtained by the combustion of silicon tetrafluoride using the prior technique of U.S. Pat. No. 2,819,151, is measured using the same procedure.

From the viscosity of the test sample and the standard sample, the thickening number of the test sample is determined, according to the following relationship:

$$\text{Thickening number} = \frac{\text{viscosity of the text sample} \times 100}{\text{viscosity of the standard sample}}$$

Commercially available silicon dioxides prepared by flame combustion of silicon tetrachloride have thickening numbers between 70 and 160. Silicon dioxide having a specific surface area of 200 m$^2$/g and a low bulk density usually has the highest thickening number, and therefore this is the silicon dioxide normally used as a thickening agent for polyester compositions, paint, varnishes and lacquers.

Silicon dioxides prepared by vapor phase hydrolysis of silicon tetrafluoride have a thickening number between 70 and 120. The best thickening effect is demonstrated by such silicas having specific surface areas of from 200 to 250 m$^2$/g and a low bulk density of about 50 g/liter.

In contrast to these, silicon dioxide of surface areas of from 200 to 250 m$^2$/g and a low bulk density of about 50 g/liter, prepared in accordance with the process of the invention, have thickening numbers ranging from 150 to 300.

EXAMPLE 1

In the apparatus shown in FIG. 3, using a burner with six nozzles, the following gas flows were fed to the nozzles through line 23 at 20° C. and one bar pressure:

| | |
|---|---|
| Fuel gas (89.0% H$_2$ + 11.0% CH$_4$) | 285 m$^3$/h |
| Silicon tetrafluoride | 49.7 m$^3$/h |

-continued

| | |
|---|---|
| Primary air | 815 m³/h |

Through line 28 there was fed secondary air, at a flow of 272 m³/hour.

The burner nozzles and the gas flows were so adjusted that there were obtained intense flames having a high turbulence. The cooling jacket surfaces 21 were kept at a temperature of about 160° C. by means of circulating boiling water, that was kept at a superatmospheric pressure of 6 bars.

The jacketed walls 32 of the reactor 30 were cooled using air to a temperature of about 300° C. In the cooler 29 the gaseous reaction mixture with the silicon dioxide was cooled using boiling water to 610° C.

The silica obtained was separated in three cyclones connected together in series, while the hydrogen fluoride content and the silicon tetrafluoride content of the waste gases were recovered by absorption in water. The silica was weighed and analyzed, and the specific surface area and the thickening number determined, with the results shown in Table I as Example 1.

As a Control, the same reaction was repeated, using the same apparatus and the same gas amounts, with the exception, however, that the cooling surfaces were not cooled. The results obtained are shown in Table I, below, under Control.

It is apparent from the result that the cooling of the flame reaction zone in the region shown gives a considerable improvement in the thickening capability of the silicon dioxide.

EXAMPLE 2

In the apparatus shown in FIG. 3, using a burner with twenty nozzles, each individually surrounded by cooling jackets, the following gas flows were fed through line 23 at 20° C. and one bar pressure:

| | |
|---|---|
| Fuel gas (89.0% H₂ + 11.0% CH₄) | 285 m³/h |
| Silicon tetrafluoride | 49.7 m³/h |
| Primary air | 815 m³/h |

Through line 28 there was fed secondary air, at a flow of 272 m³/hour.

The burner nozzles and the gas flows were so adjusted that there were obtained intense flames having a high turbulence. The cooling surfaces were kept at a temperature of about 160° C. by means of boiling water that was kept at a superatmospheric pressure of six bars.

The jacketed walls 32 of the reactor 30 were cooled using air to a temperature of about 300° C. In the cooler 29, the gaseous reaction mixture with silicon dioxide was cooled using boiling water to 610° C.

The silica obtained was separated in three cyclones connected together in series, while the hydrogen fluoride content and the silicon tetrafluoride content of the waste gases were recovered by absorption in water. The silica was weighed and analyzed, and the specific surface area and thickening number determined, with the results shown in Table I as Example 2.

As a Control, the same reaction was repeated, using the same apparatus and the same gas flows with the exception however that the cooling surfaces were not cooled. The results obtained are shown in Table I below, under Control.

It is apparent from the results that the cooling of the flame reaction zone in the region shown gives a considerable improvement in the thickening capability of the silicon dioxide.

EXAMPLE 3

In the apparatus shown in FIG. 3, using a burner with twenty burner nozzles, each provided with twelve pipes as shown in FIG. 2, the following gas flows were fed through line 23 at 20° C. and one bar pressure:

| | |
|---|---|
| Fuel gas (89.0% H₂ + 11.0% CH₄) | 285 m³/h |
| Silicon tetrafluoride | 49.7 m³/h |
| Primary air | 815 m³/h |

Through line 28 there was fed secondary air at a flow of 272 m³/hour.

The burner nozzles and the gas flows were so adjusted that there were obtained intense flames having a high turbulence. The cooling surfaces were kept at a temperature of about 160° C. by means of boiling water that was kept at a superatmospheric pressure of six bars.

The jacketed walls 32 of the reactor 30 were cooled using air to a temperature of about 300° C. In the cooler 29 the gaseous reaction mixture with silicon dioxide was cooled using boiling water to 610° C.

The silica obtained was separated in three cyclones connected together in series, while the hydrogen fluoride content and the silicon tetrafluoride content of the waste gases were recovered by absorption in water. The silica was weighed and analyzed, and the specific surface area and thickening number determined, with the results shown in Table I as Example 3.

EXAMPLE 4

In the apparatus used in Example 3, with twenty nozzles, the following gas flows were fed through line 23 at 20° C. and one bar pressure:

| | |
|---|---|
| Fuel gas (100% H₂) | 384 m³/h |
| Silicon tetrafluoride | 49.7 m³/h |
| Primary air | 825 m³/h |

Through line 28 there was fed secondary air at a flow of 275 m³/hour.

The burner nozzles and the gas flows were so adjusted that there were obtained intense flames having a high turbulence. The cooling surfaces were kept at a temperature of about 160° C. by means of boiling water that was kept at a superatmospheric pressure of six bars.

The jacketed walls 32 of the reactor were cooled using air to a temperature of about 300° C. In the cooler 29 the gaseous reaction mixture with silicon dioxide was cooled using boiling water to 610° C.

The silica obtained was separated in three cyclones connected together in series, while the hydrogen fluoride content and the silicon tetrafluoride content of the waste gases were recovered by absorption in water. The silica was weighed and analyzed, and the specific surface area and thickening number determined with the results shown in Table I, under Example 4.

TABLE I

| Example No. | Silicon Dioxide kg/h | Yield % | Specific surface area m²/g | Thickening number |
|---|---|---|---|---|
| 1 | 102 | 82 | 208 | 175 |
| Control | 100 | 81 | 212 | 104 |
| 2 | 114 | 77 | 302 | 185 |
| Control | 119 | 80 | 153 | 122 |

TABLE I-continued

| Example No. | Silicon Dioxide kg/h | Yield % | Specific surface area m²/g | Thickening number |
|---|---|---|---|---|
| 3 | 100 | 81 | 246 | 207 |
| 4 | 103 | 83 | 210 | 288 |

Having regard to the foregoing disclosure, the following is claimed as the inventive and patentable embodiments thereof:

1. A process for preparing finely divided silicon dioxide having high thickening capacity and good thixotropic properties which comprises reacting a silicon fluoride in the vapor phase with water vapor, combustible gas and free oxygen-containing gas to form silicon dioxide and hydrogen fluoride in a flame reaction zone including a burner and a flame whose base extends outwardly from the burner, the reaction zone surrounding the flame including the base of the flame, and at least the portion of the burner at the base of the flame while cooling the gaseous reaction mixture in that portion of the reaction zone surrounding the base of the flame and the portion of the burner at the base of the flame sufficiently to effect a silicon dioxide having a higher degree of agglomeration and a higher thickening number than silicon dioxide prepared as above absent said cooling, by contact with a cooling surface maintained at a temperature below 500° C. but above the dew point of the reaction waste gases generated in the flame reaction.

2. A process according to claim 1 in which the silicon fluoride is silicon tetrafluoride.

3. A process according to claim 1 in which the flame reaction zone is generated by a flame having a flame intensity of 200 kW.

4. A process according to claim 1 in which the flame reaction zone is generated by a plurality of small flames of which each has a maximum flame intensity of 10 kW.

5. A process according to claim 1 in which the combustible gas comprises at least 60% by volume of hydrogen.

6. A process according to claim 1 in which the cooling surface encloses that portion of the flame reaction zone on all sides.

7. A process according to claim 1 in which the flame reaction zone comprises a plurality of such zones, that portion of each zone being enclosed on all sides by a cooling surface.

* * * * *